Aug. 8, 1967     I. M. LEVY     3,335,307
POLYPHASE WINDING ARRANGEMENTS
Filed March 25, 1964     3 Sheets-Sheet 1
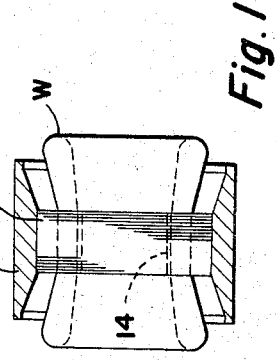
INVENTOR.
Irving M. Levy
BY
*His Attorney*

INVENTOR.
Irving M. Levy
His Attorney

United States Patent Office 3,335,307
Patented Aug. 8, 1967

3,335,307
POLYPHASE WINDING ARRANGEMENTS
Irving M. Levy, Dayton, Ohio, assignor to General Motors Corporation, Detroit, Mich., a corporation of Delaware
Filed Mar. 25, 1964, Ser. No. 354,615
1 Claim. (Cl. 310—202)

This invention relates to stator winding arrangements for polyphase machines.

Problems of placing necessary conductors for polyphase stator winding arrangements arise as to physical size and layering. Usually considerable winding time is needed to fit winding arrangements to stator slots for a three-phase motor means. In accordance with the present invention, an object is attained to provide only two stator winding layers though having a concentric coil three-phase winding arrangement. Furthermore, such a two-layer, three-phase, six-pole winding can be adapted for machine placement rather than only manual stator slot fitting operation.

Another object of the present invention is to provide a six-pole three-phase motor winding arrangement requiring only two layers of conducting material fitted into predetermined stator slots for machine winding placement.

Another object of this invention is to provide a six-pole three-phase motor winding arrangement including a two-layer consequent pole winding having a first layer with two of the three phases in winding portions of a five-slot-spanning throw and a second layer with the third of the three phases in winding portions of a seven-slot-spanning throw for a 36-slot magnetic stator core.

A further object of this invention is to provide a six-pole three-phase motor winding arrangement including a distribution of three concentric coils per phase in each of two main layers with coil portions of a seven-slot-spanning throw and a single manually-fitted coil in a third layer for a 36-slot magnetic stator core.

Another object of this invention is to provide a six-pole three-phase motor winding arrangement requiring only two layers of conducting material fitted into predetermined stator slots including consequent pole winding having both layers with all polyphase portions of a five-slot-spanning throw for a 36-slot magnetic stator core.

Further objects and advantages will become apparent from the following description, reference being had to the accompanying drawings wherein preferred embodiments of the present invention are clearly shown.

In the drawings:

FIGURE 1 is a sectional elevational view of a polyphase wound stator component for a motor having features in accordance with the present invention.

FIGURE 2 illustrates another embodiment of two-layer three-phase motor stator winding arrangement.

Figure 3:
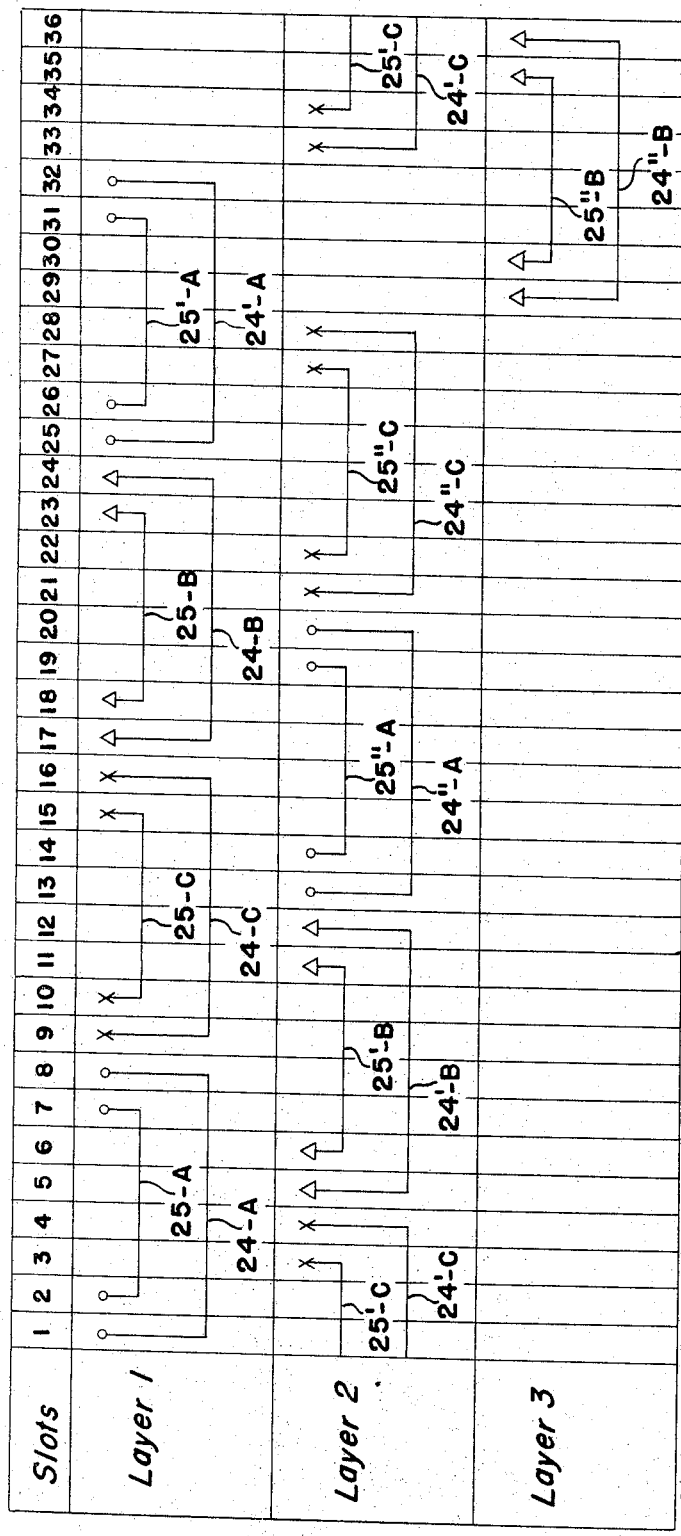
FIGURE 3 shows a further embodiment of six-pole three-phase motor stator winding arrangement.

FIGURE 1 illustrates a sectioned assembly of an annular frame or housing 10 as well as a laminated stator core 12 as well as a coil or stator winding means W. The stator winding core has a bore 14 axially therethrough in a well-known manner where a suitable rotor (not shown) can rotate as journaled by well-known end frame portions (not shown) suitably attached to the opposite axial ends of the frame 10.

FIGURE 2 shows a developed view of the stator core having 36 slots radially therein arbitrarily designated by numerals in sequence from 1 through 36. In accordance with the present invention the stator winding includes both a first layer of coils as well as a second layer of coils in a winding arrangement for six-pole three-phase motor means. Suitable insulating means which can have an H shape can be provided between the second and first layers. Thus it is possible to obtain polyphase characteristics where previously three layers of windings had to be forced into limited slot space on a dynamoelectric machine stator core.

In FIGURE 2 an embodiment of two-layer three-phase motor stator winding arrangement is shown having first and second layers of consequent pole concentric winding portions fitted into 36 slots of a magnetic stator core. Only dual layers of such coil portions are necessary and both of these layers can be machine wound into place by having the first layer of outer coil portions cover a span or throw of five slots. Thus in layer one there are concentric coil portions in pairs having an outer coil portion wound from slots 5–10 and inner coil portions to span from slot 6 to slot 9 for example. In the first layer there are thus six groups of pairs of concentric coil portions designated by reference numerals 20 and 21 respectively for outer and inner coil portions as well as including a suffix of a letter B or C to designate which coil portions belong to two of three differing phases available for single voltage only when the coil portions are formed by individual wiring. Thus two of the three phases are available from the first layer of wiring or coil portions fitted into the 36 slot magnetic stator core. For distinguishing placement of coil portions in differing slots of the first layer reference numerals designating the inner and outer coil portions have single and double primes indicated therewith.

The second layer of the winding arrangement of FIGURE 2 has machine wound coil portions 22–A and 23–A therewith such that each slot has only one end of a particular coil portion of any of the layers therein. The outer concentric coil portion 22–A thus has ends thereof in slots 1 and 8 and each of the outer concentric coils of this layer has a throw of 7 slots as shown. Single and double primes are used with the reference numerals 22 and 23 to designate subsequent placement of coil portions in slots 13–20 and 25–32 for example. Thus the suffix designations A, B, and C represent the three phases. It is to be understood that concentric winding as well as random or chain windings can also be used with the throws as indicated for the embodiment of FIGURE 2.

In FIGURE 3 there is a further embodiment of winding arrangement for a six pole polyphase winding having one coil per pole per phase and requiring no coil separators or insulating material therebetween. In each of two main layers there are coil portions of each of three phases. Thus in a first layer there are coil portions 24–A and 25–A with a seven slot throw or span for the outer coil portion 24–A. An additional set of coil portions for the same phase represented by a suffix A is shown spanning slots 25–32 in the first layer as represented by a single prime added to the reference numeral while in a second layer there is a third set of coil portions of this same phase represented by a double prime added to reference numerals of this particular phase. This last set of coil portions spans slots 13–20 and also has a throw of seven slots. For the second phase there is one set of concentric coil portions in the first layer specifically in slots 17–24 designated by reference numeral 24–B as well as an inner coil portion in slots 18–23 designated by reference numeral 25–B. A similar set of coil portions in the second layer designated by reference identification having a prime added thereto includes one coil portion spanning slots 5–12 and an inner coil portion spanning slots 6–11. For this second phase a single coil in a partial third layer is fitted and includes a coil portion spanning slots 29–36 as well as an inner coil portion spanning slots 30–35 both having reference numerals designated with a double prime as shown in FIGURE 3. Only one set of coil portions of the third phase is provided in the first layer including an outer coil portion 24–C spanning slots 9–16 and an inner coil portion spanning slots 10–15 as identified by a reference 25–C. Two sets of coil portions for the third phase are provided in particular slots in the second layer as designated by similar reference numerals having single and double primes added thereto. Both the first and second layers of coil portions are machine wound into positions. It is to be noted that all ends of coil portions occupy only one slot per se and that no particular slot includes more than one coil end portion therein.

Figure 4:
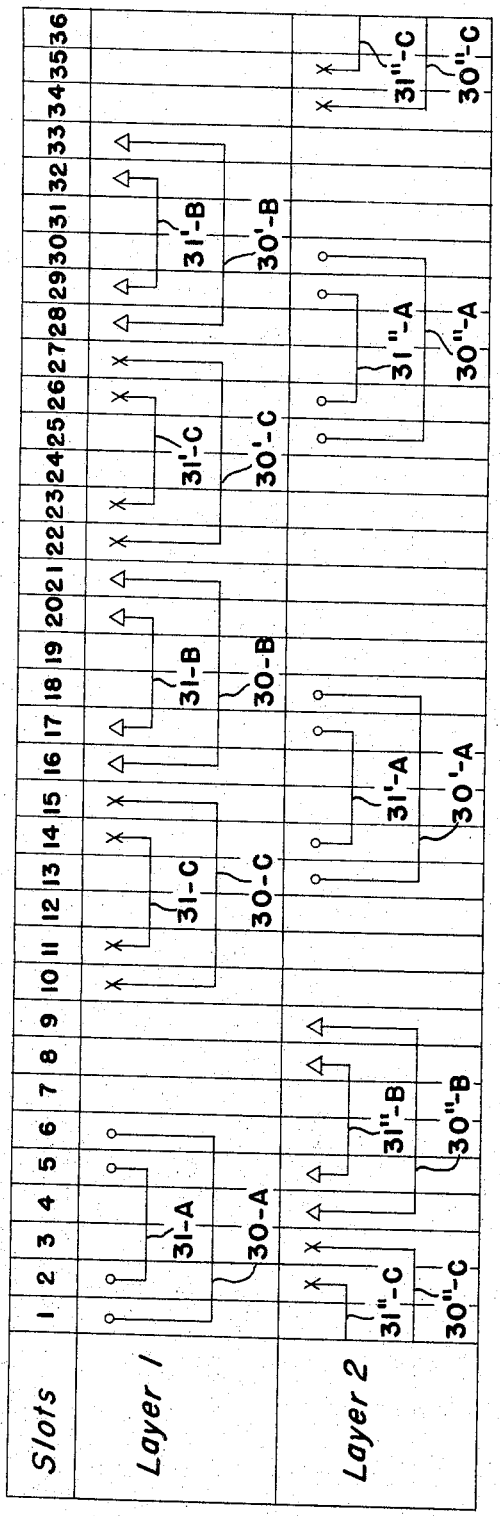
FIGURE 4 is a developed view of still another embodiment of two-layer three-phase motor stator winding arrangement in accordance with the present invention.

In FIGURE 4 there is a developed view of still a further embodiment of dual layer three-phase motor stator winding arrangement having coil portions of each layer fitted into predetermined slots by machine winding operation. Each of the outer coil portions for this dual layer consequent six pole concentric winding has a throw of five slots. In the embodiment of FIGURE 4 it is to be noted however that there are certain ends of inner coil portions only which share particular slots with ends of other inner coil portions. Each of the two layers in the embodiment of FIGURE 4 includes coil portions belonging to each of three phases. Thus in FIGURE 4 in the first layer there is a placement of an outer coil portion 30–A spanning slots 1–6 and an inner coil portion 31–A spanning slots 2–5. Similarly, an outer coil portion 30–B as well as an inner coil portion 31–B can span slots 16–21 and 17–20 respectively. The first layer in the embodiment of FIGURE 4 includes a second set of coils for the second phase and these are designated by similar reference numerals having a single prime added thereto. Also in the first layer the third phase windings include a first set of coil portions 30–C and 31–C spanning slots 10–15 and 11–14 respectively. A second set of this third phase is represented by coil portions designated by similar reference numerals having a single prime added thereto and spanning slots 22–27 and 23–26 for outer and inner coil portions respectively.

The second layer of the winding arrangement of FIGURE 4 includes a certain set of coil portions for each of the phases bearing a suffix B and C while in the second layer both the second and third sets of coils for the first phase designated by a suffix A are presented by both single and dual prime designations. It is to be noted that slots numbered 2, 5, 14, 17, 26 and 29 each have more than one end of a particular inner coil portion fitted therein though only two layers rather than three layers are needed to provide a three phase winding arrangement. It is to be understood that in the embodiments of FIGURES 2, 3 and 4 the coil portions can be fitted as lap wound windings as well as concentric coil portions. The concentric coil windings can be placed by apparatus in accordance with Patent 2,304,520, Wirtz et al., issued Dec. 8, 1942, to the assignee of the present invention. When lap wound using chain winding apparatus such as disclosed in Patent 2,988,291, Greene et al., issued June 13, 1961, on a stator coil winding machine, the windings can be provided to have identical span such as across slots 1–7 and 2–8 to facilitate chain winding operation. This stator coil winding machine can have added features in accordance with disclosures of co-pending applications S.N. 11,654, filed Feb. 29, 1960, S.N. 18,125, filed Mar. 20, 1960, S.N. 145,417, filed Oct. 16, 1961, and S.N. 145,418, filed Oct. 16, 1961. All of these stator winding machine disclosures belong to the assignee of the present invention. Also it is to be noted that in the views of FIGURES 2, 3 and 4 there are no inter-coil connections shown since these are to be connected in a usual manner electrically. The physical arrangement of the coil portions in these views of FIGURES 2, 3 and 4 are unique in that the coil portions are concentrated in two layers for a three phase winding arrangement to facilitate use of machine stator winding equipment.

Features of the present invention are of particular value for integral horsepower polyphase motors used industrially.

While the embodiments of the present invention as herein disclosed constitute preferred forms, it is to be understood that other forms can be adopted.

What is claimed is as follows:

A six-pole three-phase motor winding arrangement for an arbitrarily numbered 36-slot magnetic stator core, comprising, a first main layer of coil portions having a seven-slot span including outer concentric coils fitted into slots 1–8, 9–16, 17–24 and 25–32 as well as inner concentric coils fitted into slots 2–7, 10–15, 18–23 and 26–31 respectively, a second main layer of coil portions having a seven-slot span including outer concentric coils fitted into slots 33–4, 5–12, 13–20 and 21–28 as well as inner concentric coils fitted into slots 34–3, 6–11, 14–19 and 22–27 respectively, and a further auxiliary layer of fitted coil portions also having an inner coil spanning slots defined by five teeth as fitted into slots 30–35 and an outer coil in slots spanning seven teeth as fitted only into slots 29–36 such that each slot has only one end of a coil portion of polyphase winding arrangement.

References Cited
UNITED STATES PATENTS

| | | | |
|---|---|---|---|
| 1,066,893 | 7/1913 | Fechheimer | 310—202 |
| 2,647,696 | 8/1953 | Brunand | 310—202 |
| 2,796,543 | 6/1957 | Dunn | 310—202 |
| 2,905,840 | 9/1959 | Dunn | 310—202 |
| 2,947,894 | 8/1960 | Strang et al. | 310—202 |

MILTON O. HIRSHFIELD, *Primary Examiner.*

L. L. SMITH, *Assistant Examiner.*